United States Patent
Zhuang et al.

[11] Patent Number: 6,161,657
[45] Date of Patent: Dec. 19, 2000

[54] MECHANICAL LOCK WITH A CAM-DRIVEN LOCKING PAWL

[75] Inventors: Jim Zhuang; Kevin Tribbett, both of Westfield, Ind.

[73] Assignee: P. L. Porter Co., Woodland Hills, Calif.

[21] Appl. No.: 09/088,212

[22] Filed: May 29, 1998

[51] Int. Cl.⁷ ................................. B65H 59/10
[52] U.S. Cl. ............................ 188/67; 188/265
[58] Field of Search .............. 188/265, 67, 82.1, 188/82.74, 82.7, 60; 297/367, 362.12, 366, 375, 361.1

[56] References Cited

U.S. PATENT DOCUMENTS

| | | | |
|---|---|---|---|
| 5,265,936 | 11/1993 | Droulon et al. | 297/361.1 |
| 5,280,999 | 1/1994 | Jones et al. | 297/361.1 |
| 5,618,083 | 4/1997 | Martone et al. | 188/67 |
| 5,718,482 | 2/1998 | Robinson | 297/362.12 |
| 5,871,259 | 2/1999 | Gehart | 297/362.12 |
| 5,899,533 | 5/1999 | Tatematsu | 297/367 |
| 5,984,412 | 11/1999 | Magyar | 297/367 |

*Primary Examiner*—Robert J. Oberleitner
*Assistant Examiner*—Thomas J. Williams
*Attorney, Agent, or Firm*—Oppenheimer Wolff & Donnelly LLP

[57] ABSTRACT

A rack mounted within the housing of a mechanical lock translates. The rack, which has a rectangular cross-section, has teeth along one surface. A toothed pawl pivots housing between a locked and unlocked position. The teeth on the pawl engage the rack teeth when the pawl is locked. The pawl has a window that receives a cam. The cam has a first surface that engages a surface of the window when the cam is in the locked position. In that position, the cam prevents pawl movement teeth away from the teeth on the rack. A second surface of the cam pushes against a different surface of the window when the cam is in the unlocked position. In that position, the cam disengages the pawl teeth from the rack teeth. The window has a chamfered surface to move the pawl to its locked position.

15 Claims, 4 Drawing Sheets

MECHANICAL LOCK WITH A CAM-DRIVEN LOCKING PAWL

BACKGROUND OF THE INVENTION

1. Field of the Invention

The present invention relates to mechanical locks, primarily those used in vehicle seat positioners and recliners.

2. State of the Art

Mechanical locks allow parts to move relative to each other and to lock them together when necessary. Vehicle seats often use mechanical locks to control seat elevation and tilt angle and to lock the seat on horizontal rails to position the seat horizontally. Porter and Sember, U.S. Pat. No. 3,874,480 (1975), "Friction Brake Mechanism," Porter, U.S. Pat. No. 4,577,730 (1986), "Mechanical Lock," and Porter and Babiciuc, U.S. Pat. No. 5,219,045 (1993), "Linear Mechanical Lock with One-Piece Lock Housing," are examples.

These locks usually rely on a translating rod within an elongated, tubular housing. Either the housing or the rod attaches to a stationary vehicle part, and the other end attaches to a vehicle part. A coil spring, which is fixed relative to the housing, encircles the rod. The spring's normal inside diameter is slightly less than the rod's outside diameter. A release lever acting on the coil spring's free end unwinds or uncoils the spring slightly, which increases the spring's inside diameter enough to release the rod.

These mechanical locks can have problems. The rod is circular, so it can rotate slightly within the housing. Slight rotation can degrade the locking characteristics and damage the lock. Much force is needed to overcome the spring tension of the locking springs. Also, the mechanism that uncoils the springs must move far, which slows locking and unlocking of the lock. Buckling under high loads can also be a problem. Last, the prior art locks require complex assembling, which adds to their costs.

SUMMARY OF THE INVENTION

Overcoming problems in the prior art, therefore, is an object of the present invention. Specifically. the lock should open quickly. A rectangular rack replaces the cylindrical rod to prevent rotation and move better. Another object is to prevent buckling under comparable loads. As will be evident, the present invention does this by directing forces through shorter parts or through parts where adjacent structure can absorb forces.

Passengers entering the rear seat of a two-door vehicle must "dump" the front seat by pivoting it forward. Many seats dump merely by releasing the seat's mechanical lock. When the seat dumps, the locking mechanism must remain open so that one can return the seat to the upright position. One object of the present invention is to have less complex structure for maintaining the lock open after dumping. Another object of the present invention is to simplify the assembly process to lower its cost.

These and other objects of the invention may be seen more clearly from the detailed description of the preferred embodiment that follows.

BRIEF DESCRIPTION OF THE DRAWINGS

In FIG. 3, the lock is locked. In FIG. 4, the cam releases the pawl but does not yet lift the teeth on the pawl from the rack. FIG. 5 is a quick open position in which the cam disengages the pawl from the rack.

DETAILED DESCRIPTION OF THE PREFERRED EMBODIMENTS

Figure 1:
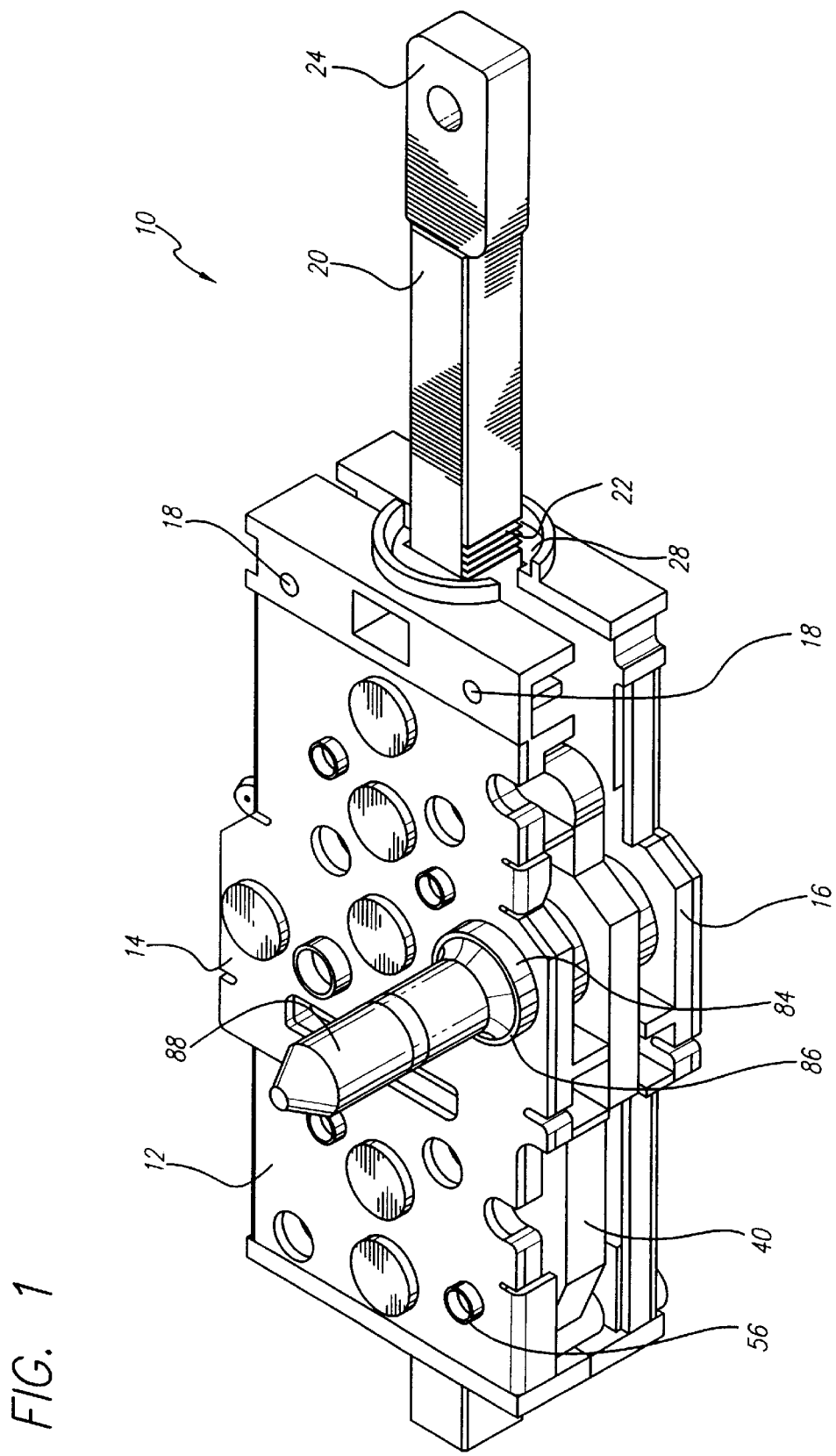
FIG. 1 is a perspective view of the mechanical lock of the present invention.

Mechanical lock 10 of the present invention (FIGS. 1 and 2) has a housing 12. The housing has a 134 mm length and 68 mm width in the exemplary embodiment. The housing, which is formed of aluminum in the exemplary embodiment, has two main sections, an upper housing section 14 and a lower housing section 16 (FIG. 1). The lower section is removed in FIG. 2 to expose internal parts. Bolts (not shown) though internal parts secure the housing sections together. These internal parts are discussed later.

A rack 20 mounts and translates axially within housing 12. In the exemplary embodiment, the rack is rectangular in shape. The rack has teeth 22 on one surface of the rack. As explained in more detail below, shafts 50, 140, 142 and 144 (FIG. 2) act as top and bottom guides for the rack. The housings mounting of a rectangular of the rack limits the rack's ability to twist about its axis. However, rectangular racks may be more costly. Accordingly applicant contemplates using a cylindrical rack. The machining process flattens the top surface of such a rack, and the teeth are cut into that flat surface. Though not the best system, one could avoid machining a flat region and cut teeth along the curved surface. The teeth in the pawl that engage curved teeth would be curved too.

Added structure on the rack and housing would prevent twisting of the rack. For example, pins could project from the rack and slide in slots in the housing. Contact between the slot walls and the pins maintains the rack from twisting. Conversely, the housing could have pins or guides that project into axial slots on the rack.

Mounting structure (not shown) attaches the housing to a stationary part of a vehicle, and a tang 24 and the outer end of the rack attaches to a moveable part of a seat. In some instances, one could mount the housing to the moveable part of the seat and attach the tang to a stationary part.

Figure 2:
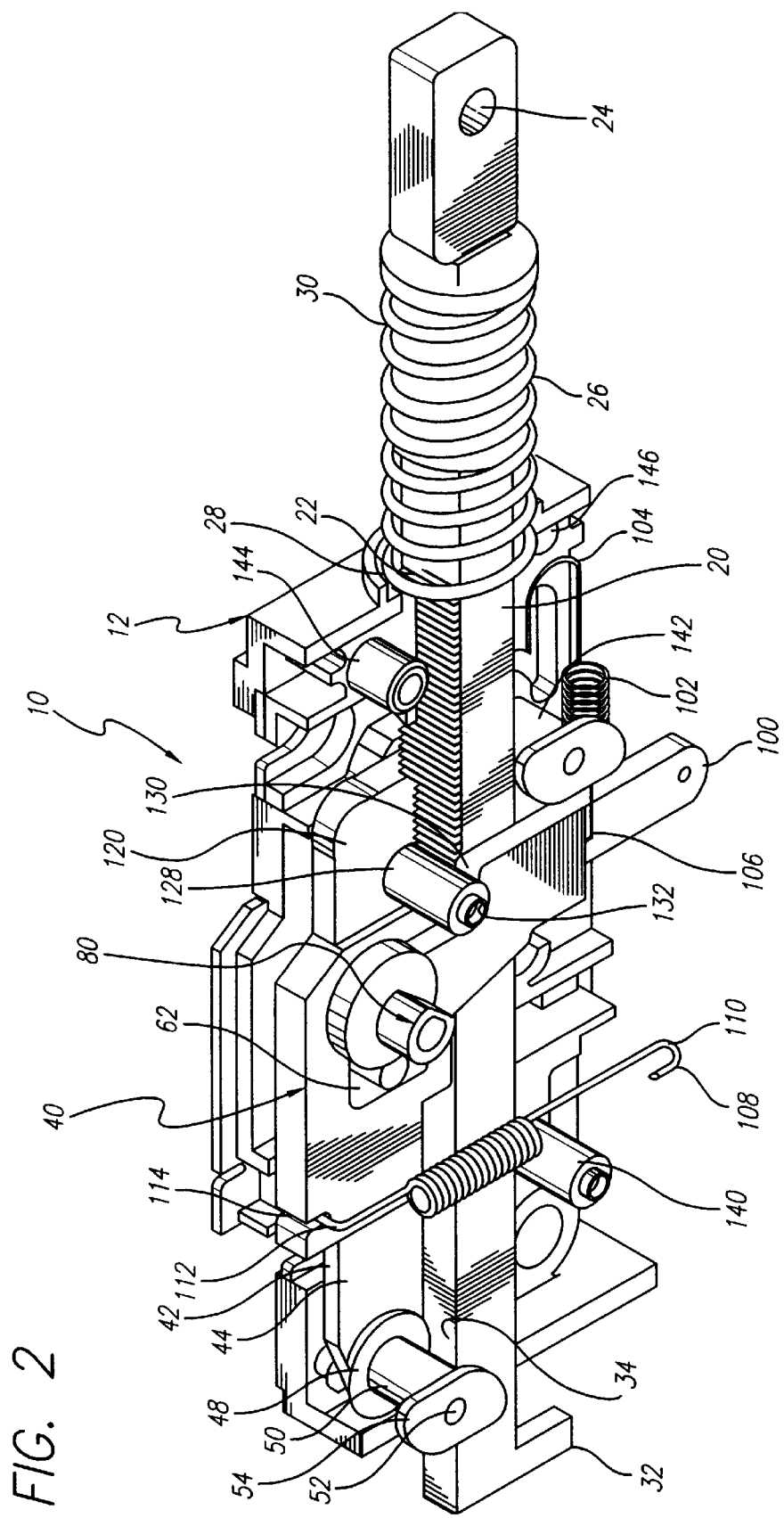
FIG. 2 is cut-away perspective view of the mechanical lock of the present invention.

A 22 mm helical compression spring 26 (FIG. 2) extends around that part of the rack that is outside the housing. One end of the spring pushes against recess 28 on the housing. The housing at the recess form a rectangular opening around the rack to support the rack and to block foreign objects from entering the inside of the housing. The other end of the spring pushes against the spacer 30, which is fixed near tang 24 on rack 20. The spacer may not be fixed rigidly, however. A short projection 32 (FIG. 2) on the other end of the rack can contact the adjacent end of the housing to limit movement of the rack to the right (FIG. 2). Finally, the surface of the rack having teeth 22 terminates, and the rear portion of that surface 34 lacks teeth.

A pawl mounts within the housing and pivots about a pivot point. Pawl 40 in the exemplary embodiment (FIGS. 2–5) is preferably investment cast steel for strength. Other ways of constructing the pawl and other materials will suggest themselves to those of ordinary skill. Pawl 40 has three principal sections. The first portion 42 is on the left side of FIGS. 3–5. The first section is a relatively straight arm 44, that tapers to a bore 46 through the end of the arm. A boss 48 surrounds the bore, and a pin 50 extends through the bore 46 (FIG. 2). Thus, pin 50 acts as a pivot point for pawl 40.

In the exemplary embodiment, pin 50 has a flat head 54. A bolt extends through an opening 52, that extends through the head and the pin. This bolt also holds the upper and lower housing sections 14 and 16 together. One end of the bolt will extend out of opening 56 in upper housing 14 (FIG. 1), and the bolt's other end extends out of a complimentary opening in lower housing section 16. Though not shown, the inside of housing section 16 has a space that receives head 54.

Pawl 40 also has a center section 60. The main features of center section 60 are its window 62 and the window's surrounding frame 64 (FIGS. 2–5). As will be discussed, window 62 houses a cam 80, and much of the inside surfaces of the window act as a cam follower. The movement of the cam against various portions of the inside surface of the window control pivoting of pawl 40. By using the word "window," one may think of a region that is open. Further, the window in the exemplary embodiment is open. However, the pawl merely needs surfaces that act as a follower for the cam. Therefore, despite using the word "window," one should appreciate that the invention does not require the wide open region that the exemplary embodiment teaches.

Window 62 has a locking surface 66. The locking surface is at the bottom right side (FIGS. 3–5) of the window and is horizontal and flat. Flat wall 66 terminates in chamfered surface 68. From chamfered surface, the outer surface of window 62 drops to a depression 70 and then back to another horizontal, flat surface 72. The depression is necessary for cam 80 to function properly. Its width is minimized to maximize the compressive load-caring abilities of the pawl. The window also has two upright surfaces 74 and 78, which are spanned by top surface 76. Though dimensions will vary with the overall size of the mechanical lock, in the exemplary embodiment, angle α (FIG. 3) as 45°. The vertical height of the chamfered surface 68 is 1.3 mm.

Cam 80 is fixed to shaft 82. An extension 86 of the shaft (FIG. 1) or an integral portion of the shaft extends through boss 86 outside the housing. Gears 88 (FIG. 1) surround part of the shaft and allow a motor or a manual drive to pivot the shaft.

Figure 3:
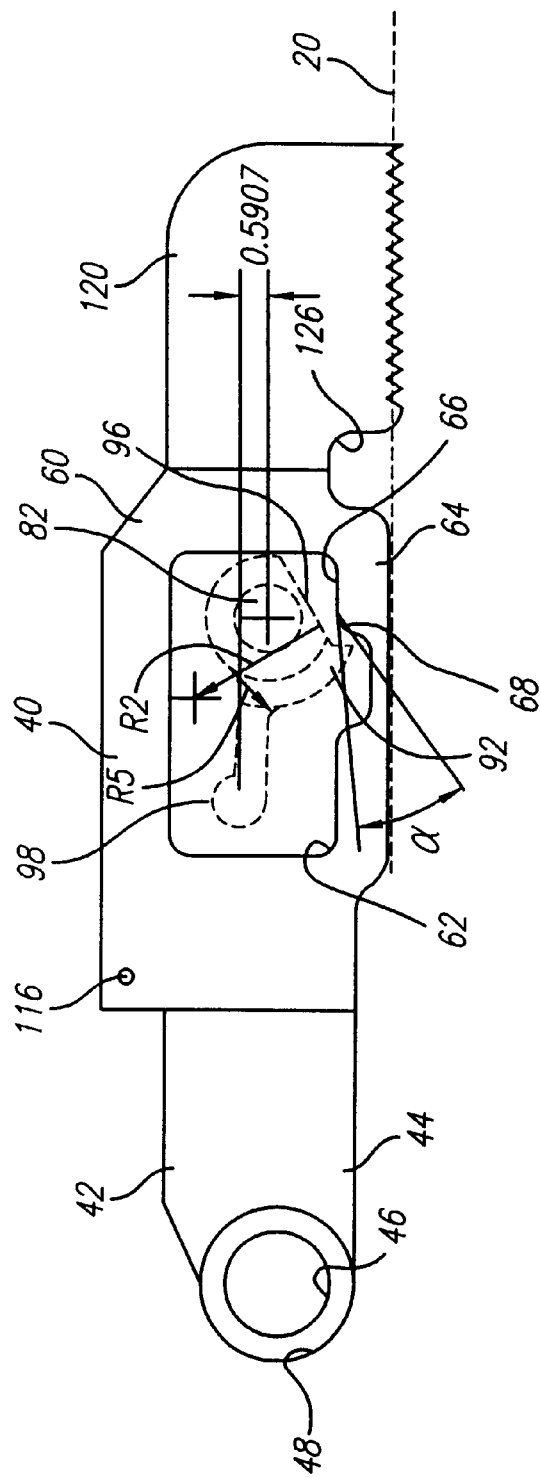
FIGS 3, 4 and 5 are three different views of the pawl and cam of the mechanical locks the present invention.

Cam 80 has an arcuate surface 90 that extends about 270° around the cam. The remaining inner surface 92 is flat. Another arcuate surface, intermediate surface 94, also is circular. It extends about 50° around the shaft. As long as intermediate surface 92 engages flat surface 66, as FIG. 3 shows, the cam blocks upward movement of the pawl. Lever 100 (FIG. 2), which is fixed to shaft 82, can cause cam 80 to rotate. Tension locking spring 102 has one end 104 fixed to the housing and the other end 106 attaches to lever 100. The spring biases the lever counterclockwise (FIG. 2). Consequently, the spring tends to maintain the cam in its FIG. 3 position. There, the intermediate surface 92 rests on horizontal surface 66 and blocks upward movement of pawl 60. Similarly, one end 110 of helper spring 108 attaches to the housing, and the other end 112 attaches to frame 64 of pawl 60. The spring urges the pawl counterclockwise (FIGS. 2–5). In FIG. 2, the end of the helper spring rests in a slot 114. Alternatively, a small hole 116 can replace the slot. Further, spring 108 could also attach to other parts of the pawl.

Figure 4:
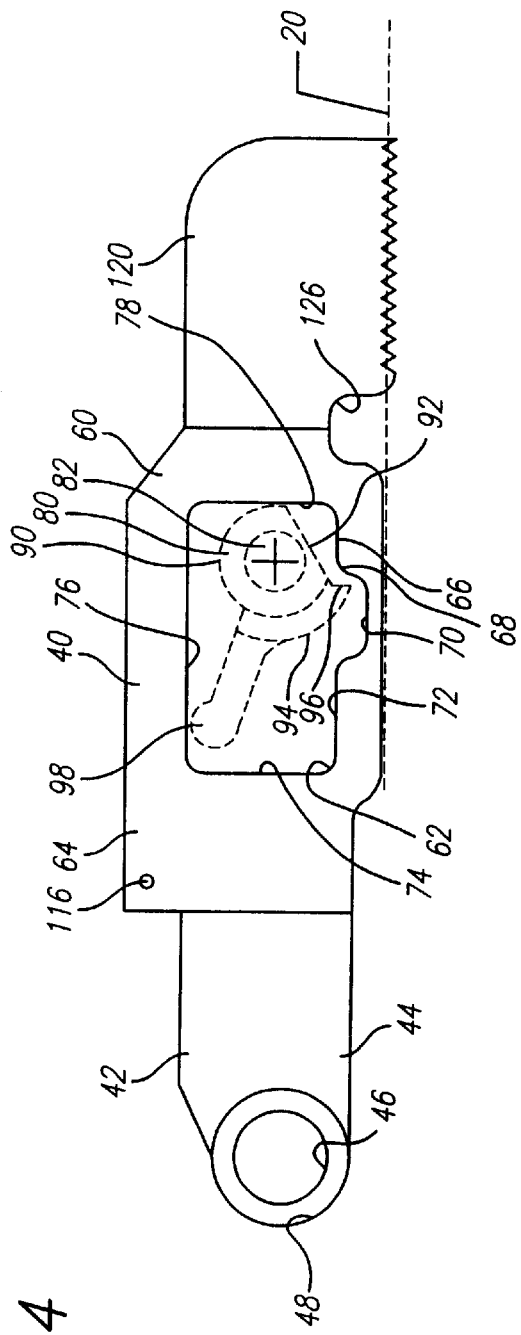
Figure 5:
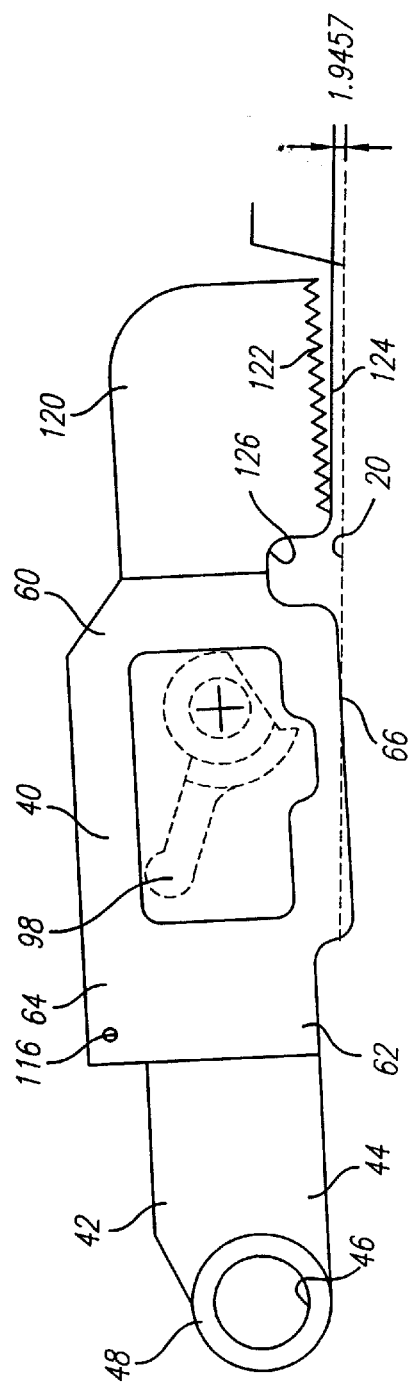

Cam 80 also has a rounded arm 98, that extends to the left in FIGS. 3 through 5. As FIG. 3 shows, when intermediate surface 92 still contacts horizontal surface 66, the cam's intermediate arm 98 is located midway along upright wall 74. As the rounded arm 98 reaches the top surface 76 of the window, edge 96 is just at chamfered surface 68. In the exemplary embodiment, at about 12° clockwise cam rotation, edge 96 releases from chamfered surface 66. At that point, the intermediate surface 94 of the cam no longer holds the pawl down.

Pawl 40 also has a hook-shaped arm 120 on its right side (FIGS. 2–5). The hook shape has a flat bottom surface 122 with teeth 124 that mate with the teeth 22 on rack 20. The hook shape also creates a small slot 126 that receives shaft 128 (FIG. 2). Shaft 128 is fixed to the housing. It is cylindrical with a hole 130 through it. A boss 132 mates with mating structure on the inside of the upper housing 14. Similar structure on the lower housing 16 secures the other end of shaft 28. A bolt (not shown) extends through opening 32 to secure the housing sections together with the shaft trapped between those sections.

As intermediate cam surface 94 becomes free of horizontal surface 66 of the window, the pawl can rotate counterclockwise about the pivot point at pin 50. However, helper spring 108 still urges the pawl clockwise. As the cam continues to rotate clockwise, the rounded arm begins exerting an upward force on horizontal surface 76. As FIG. 5 shows, continued rotation of the cam rotates the pawl counterclockwise and disengages the pawl teeth 24 from the rack 20. Once the rack teeth and pawl teeth disengage, the rack can move axially (left or right in FIGS. 3–5).

To lock the mechanical lock, the force on shaft 82 urging the cam clockwise is released. Force from helper spring 108 continues to urge pawl 40 clockwise. When the cam and pawl reach their FIG. 4 position, the edge 96 contacts chamfered surface 68, and the surface moves under the edge as the cam continues counterclockwise rotation. The force from the locking spring 102 continues to rotate the cam counterclockwise until it reaches the FIG. 3 orientation.

The cam can pivot 12° clockwise from its fully locked position before reaching the released position. At 17°, the intermediate surface of the cam is free from the horizontal surface of the window. At 20°, the rounded arm pivots the pawl sufficiently to release the pawl teeth 124 from the rack teeth 22. The cam's maximum rotation is 27°. A 27° pivot of the cam yields a 2.9° pivot of the pawl in the exemplary embodiment. At those angles, the minimum teeth to teeth distance is about 1.6 mm.

A user needing to dump the seat first unlocked the lock. As the seat pivots forward, rack 20 moves to the right (FIG. 2) until the pawl teeth 124 encounter the region 34 of the rack without teeth. Once the seat is dumped, teeth-to-teeth contact is unnecessary because the user does not have to lock the rack in a particular position. It will remain fully dumped under the influence of compression spring 26. Therefore, once the pawl teeth encounters the portion of the rack without teeth, the user can release the lock, and the rack will continue its movement to the right.

After the passenger enters or exits the rear seat, the user then undumps the seat by pulling it to a more vertical position. Unless the user releases the lock, the pawl teeth will encounter the rack teeth and stop the undumping. Therefore, once the seat reaches a minimum upright position, the user must initially release the lock, position the seat back properly and then re-engage the lock.

Prior art housings are elongated. The forces from a crash usually cause the housing to fail before other structure in the lock. Here, the housing is very compact, and the device is designed to minimize compressive loads over long distances. Where the mechanical lock positions the seat back, compressive loads on the lock occurs when the seat occupant is thrown against the seat back. The rack teeth 22 transmit the compressive forces onto the pawl teeth 124. At first glance, the pawl 40 appears to be relative long and narrow. It is about 115 mm long. However, the distance from the end of the hook shaped portion 120 to the right side of slot 126 is about 20 mm. The pin 128 occupies the slot 126. Therefore, force from the teeth transfers from the hook shaped portion 120 into shaft 128, where the housing absorbs it. At most, a short, thick, hooked shaped portion 120 is compressed, and a much smaller compressor load acts on the center section 60 and the arm 44 of pawl 40.

The design of the present invention facilitates simplified, top-down assembly method. First one of the housing sections lays on a table. The assembler then inserts several shafts into openings on the inside of that housing section. These shafts include previously mentioned shaft 128 and support shafts 140 and 142 (FIG. 2). Each support shaft has a central opening through which a locking bolt extends. The housing has mating structure for receiving both ends of the support shaft, and the locking bolts extend into openings in the housing. Tightening the bolts secures the support shafts and locks the housing around them. Support shafts 140 and 142 also support the bottom of rack 20 (FIG. 2). A spacer 144 maintains the proper spacing of the housing sections in that region. Another spacer may mount in depression 146 below the rack. The pawl, which already mounts is mounted on shaft 48 is inserted on one of the housing sections. Shaft 50 has structure that mates with similar structure on the housing section. Next, the person assembling the lock inserts cam 80 within window 62. The cam has a boss (not shown) that mates with an opening in housing section 16. The person next attaches springs 102 and 108 at their proper location. Next, the upper housing section 14 is aligned with the various shafts and projections and then mated to the other half of the housing. By now, the helical spring 26 rests in the continuous shoulder 28. Finally, the assembly inserts and tightens the bolts through the openings provided.

The operation of the mechanical lock of the present invention has been evident from the previous description, but it will be described here. In the FIG. 3 orientation, the lock is locked. Contact between rack teeth 22 on rack 20 and pawl teeth 124 prevent rack movement. Consequently, the seat back or other vehicle structure that the mechanical lock controls remains stationary. Through a connection, the user rotates cam shaft 82, which rotates the cam 80. Sufficient cam rotation causes the intermediate surfacer 92 to rotate off locking surface 66. At that point, the pawl can pivot counterclockwise. However, the helper spring 110 maintains the teeth together. After the cam rotates sufficiently, the rounded arm 98 of the cam pushes against upper wall 76 to disengage the teeth. The rack now is free to slide axially. To lock the device, the force rotating the shaft is released. Locking spring 102 urges cam 80 counterclockwise, and helper spring urges pawl 60 clockwise. As the teeth engage, the edge 96 of the intermediate cam surface 92 reaches chamfered surface 68 adjacent flat locking surface 66. Force from the cam pushes the pawl slightly clockwise to lock the pawl against the rack.

Other numerous modifications and alternate embodiments will occur to those skilled in the art. Therefore, applicant intends that the invention be limited only in terms of the appended claims.

What is claimed is:

1. A mechanical lock having a housing and a rack mounted within the housing for translating axially in the housing,
   a. teeth along a surface of the rack;
   b. a pawl mounted to a pivot point on the housing for pivoting on the housing between a locked and unlocked position, one surface of the pawl having teeth, the teeth on the pawl engaging the teeth on the rack when the pawl is in its locked position;
   c. a window in the pawl and a cam mounted for pivoting between a locked and unlocked position on the housing and extending into the window;
      i. the cam having a first surface engaging a first portion of the window when the cam is in the locked position and blocking movement of the pawl teeth away from the teeth on the rack;
      ii. the cam having a second surface engaging a second portion of the window when the cam is in the unlocked position, the second portion of the window and the first portion of the window being spaced from each other, the second surface of the cam pivoting the pawl so that the pawl teeth disengage the teeth on the rack;
      iii. the first surface of the cam releasing the first portion of the window when the cam moves away from the locked position before the cam reaches the unlocked position
   d. a slot on the pawl adjacent to the surface of the pawl having teeth, the slot having a first and second slot walls, the first slot wall being nearer the surface of the pawl having teeth; and
   e. a shaft on the housing extending into the slot.

2. The mechanical lock of claim 1 wherein the rack has a surface without teeth axial from the surface of the rack having teeth, the surface without teeth being adjacent the teeth on the pawl when the rack extends from the housing.

3. The mechanical lock of claim 1 wherein the rack has a flat surface, the teeth being on the flat surface.

4. The mechanical lock of claim 3 wherein the rack has a surface without teeth axial from the surface of the rack having teeth, the surface without teeth being adjacent the teeth on the pawl when the rack extends from the housing.

5. The mechanical lock of claim 4 wherein the surface of the rack without teeth is flat.

6. A mechanical lock having a housing and a rack mounted within the housing for translating axially in the housing,
   a. teeth along a surface of the rack;
   b. a pawl mounted to a pivot point on the housing for pivoting on the housing between a locked and unlocked position, one surface of the pawl having teeth, the teeth on the pawl engaging the teeth on the rack when the pawl is in its locked position;
   c. a window in the pawl and a cam mounted for pivoting between a locked and unlocked position on the housing and extending into the window;
      i. the cam having a first surface engaging a first portion of the window when the cam is in the locked position and blocking movement of the pawl teeth away from the teeth on the rack;
      ii. the cam having a second surface engaging a second portion of the window when the cam is in the unlocked position, the second portion of the window and the first portion of the window being spaced from each other, the second surface of the cam pivoting the pawl so that the pawl teeth disengage the teeth on the rack;
      iii. the first surface of the cam releasing the first portion of the window when the cam moves away from the locked position before the cam reaches the unlocked position;
   d. the pawl has a pivot point, an arm from the pivot point to the window and a hooked-shaped portion on the other side of the window; and
   e. the arm of the pawl being narrower than the window.

7. A mechanical lock having a housing and a rack mounted within the housing for translating axially in the housing,
   a. teeth along a surface of the rack;
   b. a pawl mounted to a pivot point on the housing for pivoting on the housing between a locked and unlocked position, one surface of the pawl having teeth, the teeth on the pawl engaging the teeth on the rack when the pawl is in its locked position;
   c. a window in the pawl and a cam mounted for pivoting between a locked and unlocked position on the housing and extending into the window; wherein the window has top and bottom surfaces, the first surface extending along part of the bottom surface, the first surface extending to a depression in the bottom surface;
      i. the cam having a first surface engaging a first portion of the window when the cam is in the locked position and blocking movement of the pawl teeth away from the teeth on the rack;
      ii. the cam having a second surface engaging a second portion of the window when the cam is in the unlocked position, the second portion of the window and the first portion of the window being spaced from each other, the second surface of the cam pivoting the pawl so that the pawl teeth disengage the teeth on the rack;
      iii. the first surface of the cam releasing the first portion of the window when the cam moves away from the locked position before the cam reaches the unlocked position.

8. The mechanical lock of claim 7 further comprising a chamfered surface between the first surface and the depression.

9. The mechanical lock of claim 7 wherein the second surface of the cam is at the end of an arm extending from the cam.

10. A mechanical lock having a housing and a rack mounted within the housing for translating axially in the housing,
   a. the rack having at least one flat surface with teeth along the flat surface;
   b. a pawl mounted to a pivot point on the housing for pivoting on the housing between a locked and unlocked position, one surface of the pawl having teeth, the teeth on the pawl engaging the teeth on the rack when the pawl is in its locked position;
   c. a cam follower adjacent the pawl and a cam mounted for pivoting between a locked and unlocked position on the housing;
      i. the cam having a first position engaging the cam follower at a first location on a first surface for blocking movement of the pawl teeth away from the teeth on the rack;
      ii. the cam having a second position engaging the cam follower at a second location on a second surface for pivoting the pawl so that the pawl teeth disengage the teeth on the rack; and
      iii. the first surface of the cam follower being non-adjacent to the second surface of the cam follower.

11. A mechanical lock having a housing and a rack mounted within the housing for translating axially in the housing,
   a. teeth along a surface of the rack;
   b. a pawl mounted to a pivot point on the housing for pivoting on the housing between a locked and unlocked position, one surface of the pawl having teeth, the teeth on the pawl engaging the teeth on the rack when the pawl is in its locked position;
   c. a window in the pawl and a cam mounted for pivoting between a locked and unlocked position on the housing and extending into the window;
      i. the cam having a first surface engaging a first portion of the window when the cam is in the locked position and blocking movement of the pawl teeth away from the teeth on the rack;
      ii. the cam having a second surface engaging a second portion of the window when the cam is in the unlocked position, the second portion of the window and the first portion of the window being spaced from each other, the second surface of the cam pivoting the pawl so that the pawl teeth disengage the teeth on the rack;
      iii. the first surface of the cam releasing the first portion of the window when the cam moves away from the locked position before the cam reaches the unlocked position;
      iv. the first portion of the window being on a first wall of the window, the second portion of the window being on a second wall of the window, the first and second walls of the window being non-adjacent to each other.

12. The mechanical lock of claim 11 wherein the window has multiple walls to form an enclosed frame, the cam being positioned inside the window.

13. The mechanical lock of claim 11 further comprising:
   a slot on the pawl adjacent to the surface of the pawl having teeth, the slot having a first and second slot walls, the first slot wall being nearer the surface of the pawl having teeth; and
   a shaft on the housing extending into the slot.

14. The mechanical lock of claim 11 wherein:
   the pawl has a pivot point, an arm from the pivot point to the window and a hooked-shaped portion on the other side of the window
   the arm of the pawl being narrower than the window.

15. The mechanical lock of claim 11 wherein the window has top and bottom surfaces, the first surface extending along part of the bottom surface, the first surface extending to a depression in the bottom surface.

* * * * *